(12) United States Patent
Ellis

(10) Patent No.: US 7,367,606 B2
(45) Date of Patent: May 6, 2008

(54) CONTAINER COVERING APPARATUS WITH REMOVABLE SUPPORTS

(75) Inventor: Rodney Scott Ellis, Macomb, MI (US)

(73) Assignee: John Donovan Enterprises-Florida, Inc., Stuart, FL (US)

( * ) Notice: Subject to any disclaimer, the term of this patent is extended or adjusted under 35 U.S.C. 154(b) by 233 days.

(21) Appl. No.: 11/376,911

(22) Filed: Mar. 16, 2006

(65) Prior Publication Data
US 2007/0216190 A1    Sep. 20, 2007

(51) Int. Cl.
*B60P 7/02* (2006.01)
(52) U.S. Cl. .............................. 296/100.13; 296/100.11
(58) Field of Classification Search ........... 296/100.11, 296/100.12, 100.13
See application file for complete search history.

(56) References Cited

U.S. PATENT DOCUMENTS

| | | | | |
|---|---|---|---|---|
| 5,253,914 A | | 10/1993 | Biancale | |
| 5,938,270 A | * | 8/1999 | Swanson et al. | 296/100.11 |
| 6,981,734 B2 | * | 1/2006 | Martin | 296/100.12 |
| 2003/0067185 A1 | * | 4/2003 | Gothier et al. | 296/100.11 |

* cited by examiner

*Primary Examiner*—Joseph D Pape
(74) *Attorney, Agent, or Firm*—Banner & Witcoff Ltd.

(57) ABSTRACT

Disclosed is a covering system that includes plural supports and a cable. The cable may be advanced or retracted. The cable is connected, preferably by a fixed support, to a portion of the cover, whereby the cover may be advanced or retracted by moving the cable. At least some, preferably all, of the supports other than the terminal support are disposed in collars, the collars for the non-connected supports being threaded onto the cable. The collars and supports may be decoupled to permit removal of a support without the need to un-thread the collar and without the need to disturb other supports. The collars include plural separable cable sleeve portions that may be decoupled from one another to permit removal of the collar from the cable without un-threading the cable from other supports.

9 Claims, 2 Drawing Sheets

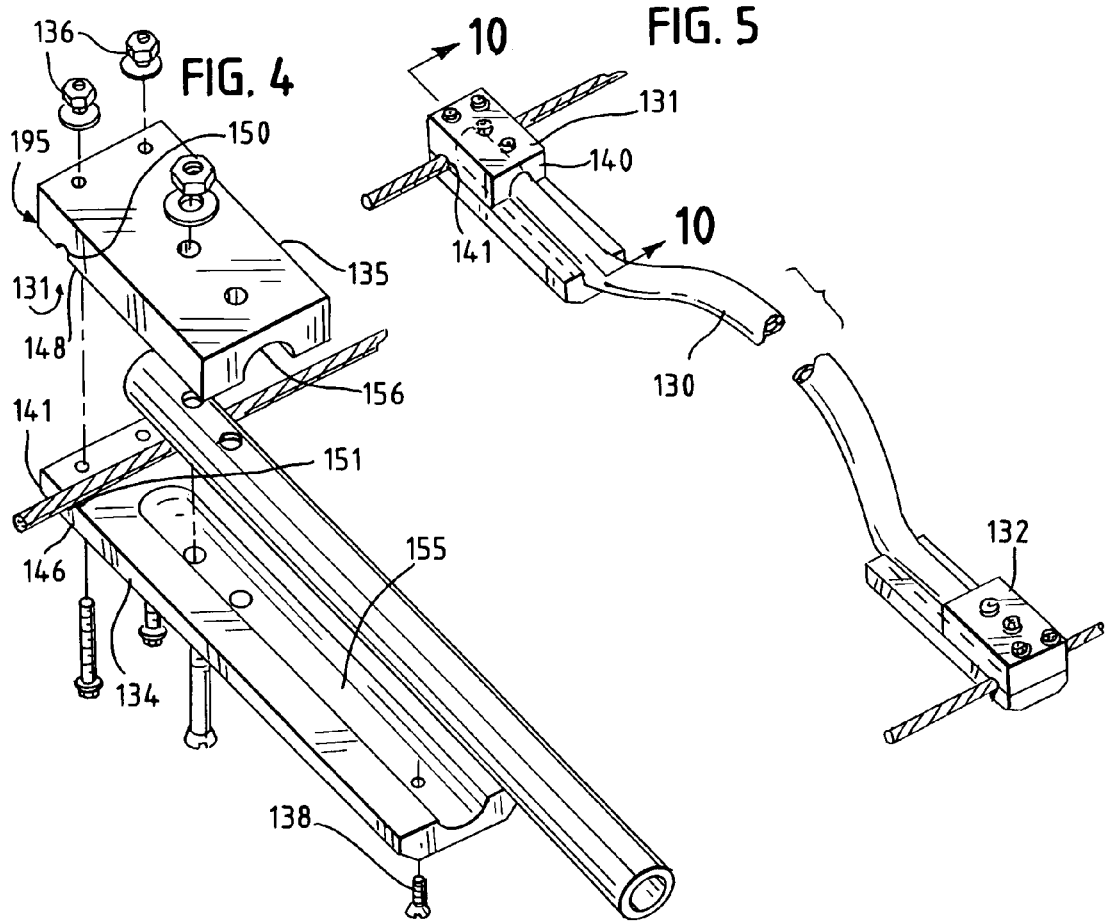
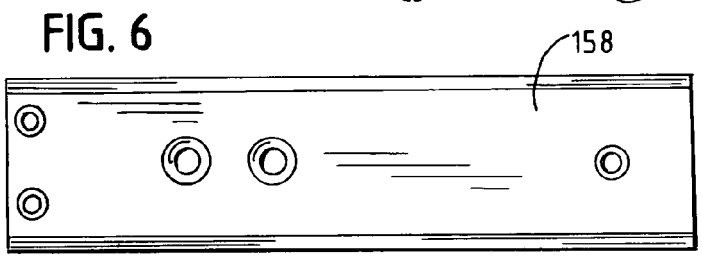
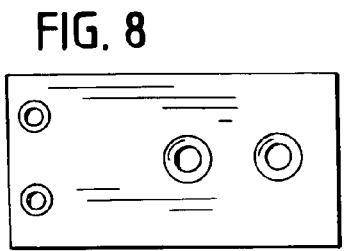
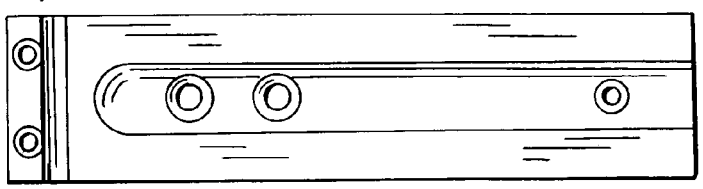
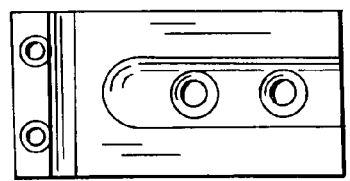
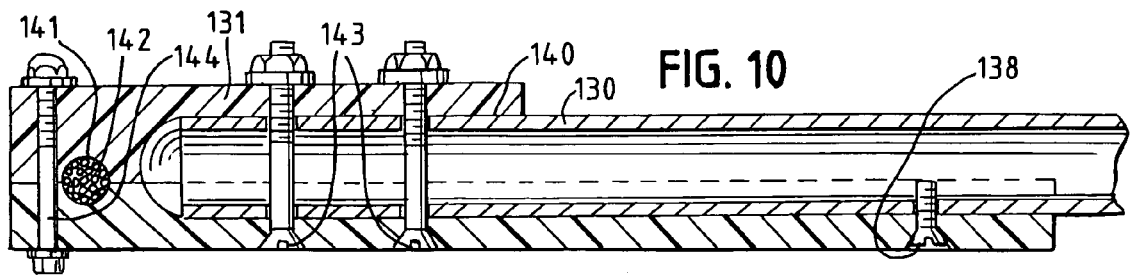

CONTAINER COVERING APPARATUS WITH REMOVABLE SUPPORTS

TECHNICAL FIELD OF THE INVENTION

The invention is in the filed of covering apparatuses, particularly for trucks and other vehicles.

BACKGROUND OF THE INVENTION

Open topped cargo compartments such as dump trucks, short vehicle trailers, storage bins and the like used to store or carry particulate material are subject to having the particulate material fall or blow out in use. Container covering apparatuses are provided to prevent or mitigate against the foregoing concern.

Numerous container covering apparatuses exist in the prior art. One known class of devices includes a cover that is connected to a series of curved supports, which conventionally are known as "bows." Such an apparatus includes two endless loop cables, each cable being connected to a pair of sheaves. One pair of sheaves is disposed on an axle connected to one end of the container, and the other is disposed on an axle connected to the other end of the container. One or both of the sheaves is connected to a chain drive or similar mechanism that is manually or electrically driven. The support that is furthest away from the drive mechanism is connected to the cables, and the other supports terminate in eyes onto which the cables are threaded. The cover is typically a flexible material that includes pockets in which the supports are disposed. This type of covering apparatus is conventionally known as a "cable tarp" apparatus.

Cable tarp apparatuses are popular because of the simplicity of their design and ease of their use. By manually or otherwise operating the drive, the operator may advance the cover by urging the connected terminal support away from the drive. When the cover is closed, the curved bows and the tension on the cover cause the cover to assume a tent-like shape over the container. The operator may retract the cover by driving the cable in the opposing direction, thereby urging the terminal support to travel in a retracting direction. The remaining supports, which typically are disposed in spaced-apart pockets in the cover, travel with the cover to permit the cover to open or close in accordion-like fashion. U.S. Pat. No. 5,253,914 purports to disclose one such apparatus.

It has been observed that the supports sometimes break during usage. In many known cable tarp apparatuses, the supports terminate on each end in an eye into which the cable is threaded. In such devices, it is inconvenient to replace a support, because the user typically must disconnect some or all of the remaining supports and subsequently re-thread the cable through the supports.

In other prior art apparatuses, the supports are designed to be removable from the apparatus, and each support terminates in a collar from which the support may be decoupled. The collars each include an eye portion through which the cable is threaded. This design allows supports to be removed individually, but prior such designs nonetheless still suffer from certain drawbacks. Specifically, it has been observed that the collars can become broken or damaged during use. In such case, the cable generally must be disconnected and re-threaded to replace or repair a collar.

The invention seeks to overcome the foregoing drawbacks in the heretofore described apparatuses.

SUMMARY

A covering system in accordance with the invention includes plural supports and a cover. Each support is connected to or engages the cover, typically by being disposed in a pocket in the cover. At least some of the supports are connected to removable collars, through which is threaded a cable that generally supports the cover and that may be moved in a direction of advancement or retraction respectively to close or open the cover. In accordance with the invention, the collars and supports may be decoupled, thereby permitting removal of a support without unthreading the connected collars, and the collars comprise plural mating cable sleeve sections that may be decoupled from one another to permit removal of the collar from a cable. A repaired or replacement collar may be installed by mating the sleeve sections over an existing cable.

Preferably, each collar includes first and second mating portions in which each portion includes a cable sleeve section and a support socket section. The cable sleeve sections each take the form of a sleeve body having a recess of semicircular cross-section. When assembled, the cable sleeve sections engage to define a cable sleeve having a channel that receives the cable, and the support receiving sections engage to define a socket for the support. The collar may be decoupled from the support to allow removal of the support, and in addition the collar portions may be disassembled to allow removal of the collar from the cable. Preferably, the collar portions are bolted to one another and to the support. By removing one or more of the bolts, the operator may thus optionally remove a support or remove a collar, in either case without the necessity of removing or re-thread the cable.

BRIEF DESCRIPTION OF THE DRAWINGS

Other objects and advantages of the invention will become apparent from the study of the following specification when viewed in light of the accompanying drawings, in which:

FIG. 4 is an exploded view of a collar and support assembly of the covering apparatus illustrated in FIGS. 2A and 2B.

FIG. 5 is a perspective view of a bowed support used in the container covering apparatus of the present invention, including a pair of collars, one disposed at each end of the bowed support.

FIG. 6 is a plan view of the normally lower side of the major portion of the collar illustrated in FIG. 4.

FIG. 7 is a plan view of the normally upper side of the major portion of the collar.

FIG. 8 is a plan view of the normally upper side of the minor portion of the collar illustrated in FIG. 4.

FIG. 9 is a plan view of the normally lower side of the minor portion of the collar.

FIG. 10 is a transverse cross sectional view of a collar and support assembly in the covering apparatus of the invention.

The designations "normally upper" and "normally lower," and other terms of orientation, should be deemed to represent preferred usage, and are not intended to be limiting. In practice, the illustrated components of the device may be used omnidirectionally.

DETAILED DESCRIPTION OF THE PREFERRED EMBODIMENTS

In the following description of the various embodiments, reference is made to the accompanying drawings, which form a part hereof, and in which is shown by way of illustration the various embodiments in which the invention may be practiced. It is to be understood that other embodiments may be utilized, and structural and functional modifications may be made, without departing from the scope of the present invention.

Generally, the invention contemplates in some embodiments a covering apparatus, and in other embodiments a container that includes a covering apparatus that is described in one or more embodiments herein. Except for the covering apparatus, the container may be conventional, and may be any truck bed, bin, trailer, cargo compartment, or the like. The invention also encompasses a vehicle that includes a container with a covering apparatus that is described in one or more embodiments herein and means for transporting the container. The means for transporting the container may be any manual or motorized form of conveyance, such as a truck tractor, rail car, or the like. In preferred embodiments of the invention, the vehicle is an open-type motorized vehicular truck.

The invention contemplates in some embodiments an electric or hydraulically operated or assisted apparatus. In preferred embodiments, however, the apparatus is manually operated. Manual operation is generally preferred for reasons of simplicity and low required maintenance, and because hydraulic or electrical energy sources may not readily be available.

Figure 1:
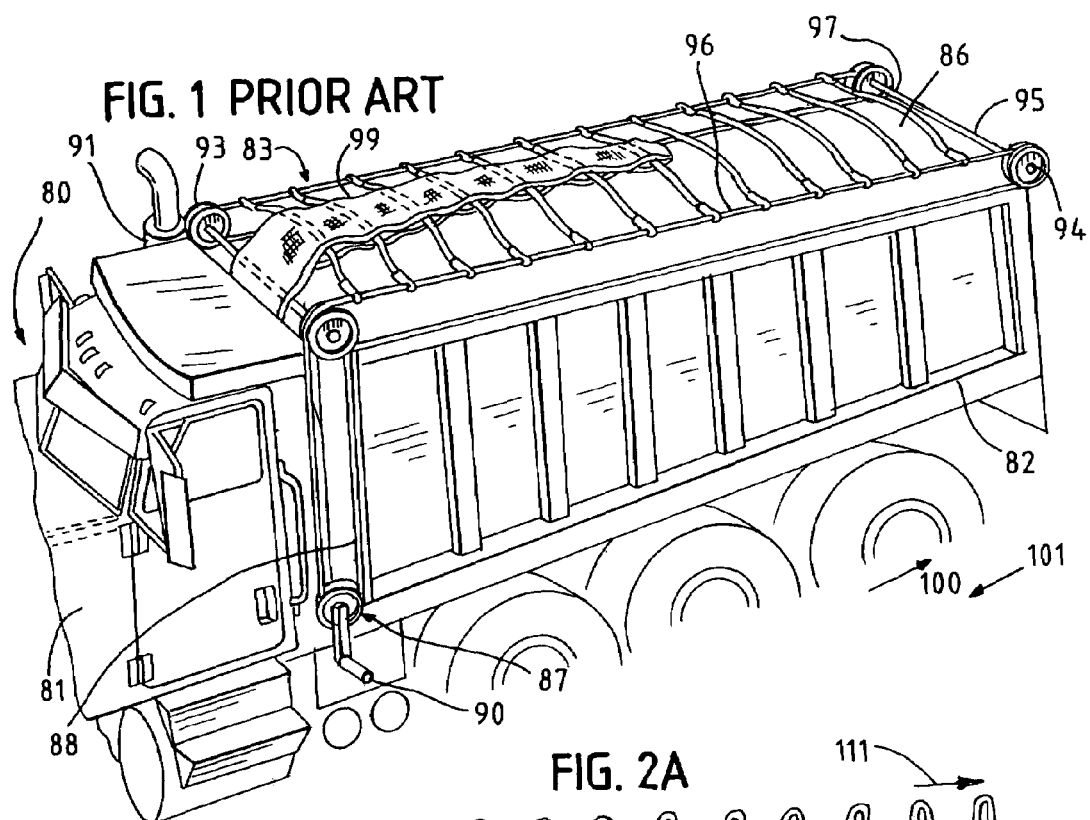
FIG. 1 is a perspective view, partially cut away, of a vehicle that includes a container covering apparatus of the prior art.

As shown in FIG. 1, the vehicle 80 of the prior art includes a truck tractor 81 and a container 82 with a covering apparatus 83. As shown therein, the apparatus includes a cover 86 and a drive mechanism 87. The drive mechanism is, in the illustrated embodiment, a manual drive that includes a chain 88 connected to a pair of sprockets, one sprocket being driven by operator handle 90 and the other sprocket being connected to an axle 91 on which is disposed a pair of sheaves 93. A second pair of sheaves 94 is disposed on an axle 95 at the other end of the container 82 and an endless loop cable 96 is carried by the sheaves on each side of the container 82.

The terminal support 97 at one end of the cable 96 in normal use is operably connected to the cable 96, by which is contemplated any direct or indirect connection that permits operation as described herein. The cable 96 is threaded onto the other supports, but otherwise the other supports are not connected to the cable 96. The supports rest in evenly spaced pockets 99 in the cover. By operating the drive to cause the cable to travel in an advancing direction (represented by arrow 100), the cover is caused to advance. Specifically, the terminal support 97 is urged in the direction of advancement, pulling with it the cover 86 and thereby, via engagement of the supports with the cover, causing the other supports to travel as needed to appropriate supporting positions. When the operator drives the cable 96 in the opposing, retracting direction (represented by arrow 101), the terminal support 97 is urged in the retracting direction ultimately to bias the remainder of the cover 86 and supports in a retracting direction to thereby retract the cover.

Figure 3:
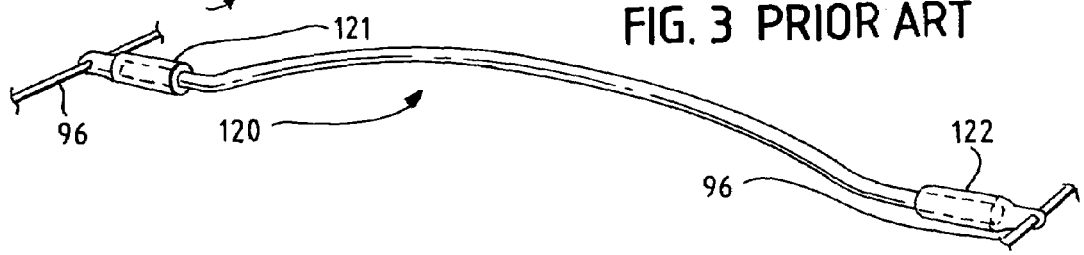
FIG. 3 is a perspective view of a bowed support used in the prior art container covering apparatus shown for the vehicle illustrated in FIG. 1.

As shown in FIG. 3, the prior art support 120 includes a pair of collars 121, 122 each of which are integral with and not subject to being decoupled from the support 120. Unthreading of the cables 96 and removal of at least some other supports typically are necessary to replace a broken support.

Figure 2A:
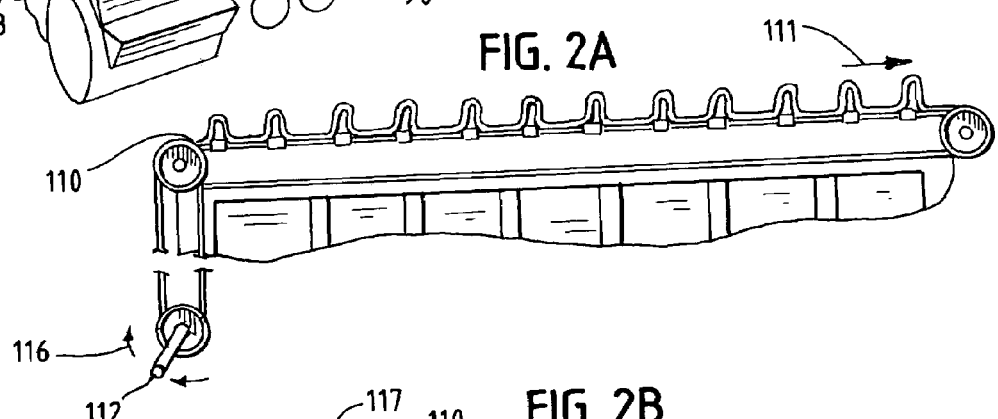
FIG. 2A is a side elevational view of a container covering apparatus in accordance with the invention, shown with the cover in an advanced position.
Figure 2B:
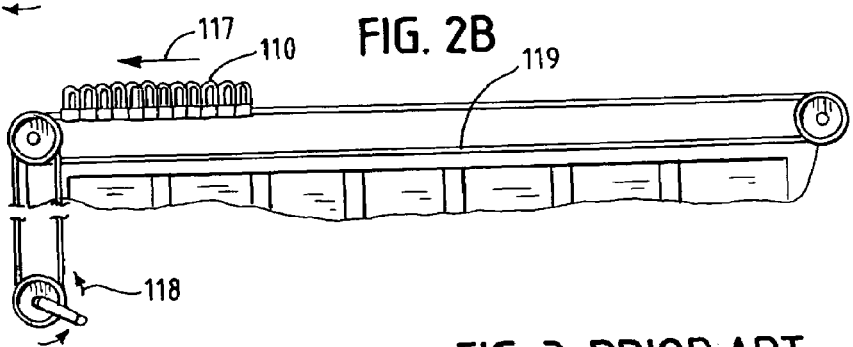
FIG. 2B is a side elevational view of a container covering apparatus in accordance with the invention, shown with the cover in a retracted position.

Except for the supports and collars, the covering apparatus of the present invention preferably takes a form substantially identical to that of the prior art covering apparatus shown in FIG. 1, as does the vehicle of the invention. Thus, for instance, with respect to FIGS. 2A and 2B, the operator may advance the cover 110 in a direction of arrow 111 (shown in FIG. 2A) by turning the handle 112 of the drive mechanism 114 in an advancing direction (represented by arrow 116). By rotating the handle in the opposing, retracting direction (represented by arrow 118 in FIG. 2B), the cover 110 is caused to travel in a retracting direction (represented by arrow 117 in FIG. 2B). Otherwise, the container, vehicle, supports, and cover may be conventional. The supports are preferably (but not necessarily) arched to allow for covering of containers in which the material inside the container overfills or otherwise extends beyond the upper perimeter 119 of the container.

As shown in FIGS. 4 and 5, the support 130 of the invention includes a pair of collars 131, 132 (one of which is shown in FIG. 4). The collars are not integral with the supports, but in normal use are removably coupled thereto. As best shown in FIG. 4, the collar 131 has first and second portions including a major portion 134 and a minor portion 135. The major and minor portions 134, 135 may be secured together with bolts, preferably with lock washers 136, and to the support 130 to define an assembly. A partial through bolt 138 is provided to stabilize the support 130. As best shown in FIG. 10, the support 130 is secured within the collar 131 by a pair of through bolts 143 and by the partial through bolt 138, while the cable 142 is not fixedly connected to the collar 131. The assembly in the illustrated embodiment includes another through bolt 144 that passes through aligned bores in the collar portions, but not through the support 130.

As illustrated in FIG. 4, the major portion 134 and minor portion 135 of the collar each include a cable sleeve section 145, 146. The cable sleeve sections each take the form of a sleeve body 148, 149 having a recess 150, 151 of semicircular cross-section. When the major portion and minor portion are mated, the cable sleeve sections engage (as shown in FIGS. 5 and 10) such that the aligned recesses define a channel 141 that permits the collar 131 to slide along a cable. The operator may assemble the portions over an existing cable without disturbing other portions of the apparatus. With further reference to FIG. 4, the major portion 134 includes a socket recess 155 and the minor portion includes a socket recess 156. When mated, the aligned socket recesses define a socket 140 (shown in FIGS. 5 and 10) that receives the support 130. The bottom surface 158 (shown in FIG. 6) of the major support defines a bearing surface for the support against the upper perimeter of the container.

The cover may be made of nylon or any other suitable material. The collars preferably are composed of UHMW polyethylene, but other materials, such as HMW polyethylene, PTFE, PVC, or the like may be employed, as may other suitable metallic or non metallic materials. The supports are preferably composed of aluminum or steel.

A covering apparatus may include any desired number of supports, preferably 3-15. The collars may be sold in pairs or other groupings, optionally but preferably with associated bolts, as a kit to permit retrofitting onto existing cable tarp apparatuses.

It is thus seen that the covering apparatus prepared in accordance with the invention permits the operator to replace a support without the need to un-thread and re-thread other supports, and likewise to remove a collar from the cable without the need to remove the cable or to un-thread the cable from other collars.

While particular embodiments of the invention have been described above, the invention is not limited thereto, and it is contemplated that numerous other embodiments within the scope of the appended claims are possible. For instance, the apparatus is useful on containers other than those illustrated herein. The description herein of preferred embodiments and of exemplary embodiments should not be construed as limiting the invention in scope. Similarly, no unclaimed language should be deemed to limit the invention in scope. The invention is deemed to be defined by the full scope of the following claims, including without limitation any equivalents that may be accorded under applicable law.

The invention claimed is:

1. A covering apparatus comprising:
   a flexible cover;
   a cable generally supporting said flexible cover, said cable being movable in a cover advancing direction and in a cover retracting direction, a portion of said cover being operably connected to said cable;
   plural supports supporting said cover, at least some of said supports being disposed in a collar, said cable being threaded onto the support for each collar;
   said collars being removably connected to said supports whereby one of said supports may be removed without un-threading said cable from said collar;
   said collar comprising plural separable cable sleeve portions that may be decoupled from one another to permit removal of the collar from said cable and that, when assembled, define a channel for said cable.

2. A covering apparatus according to claim 1, including 3 to 15 supports.

3. A covering apparatus according to claim 1, a plurality of said supports each being disposed separately within a pocket in said cover.

4. A covering apparatus according to claim 1, said apparatus including a support that is affixed to said cable.

5. A covering apparatus according to claim 1, at least one of said collars comprising:
   a first collar portion, said first collar portion including a first collar portion cable sleeve section having a recess of semicircular cross-section and a first collar portion socket section having a socket recess;
   a mating second collar portion, said second collar portion including a second collar portion cable sleeve section having a recess of semicircular cross-section and a second collar portion socket section having a socket recess;
   said first and second collar portions mating to form an assembly in which said first and second collar portion cable sleeve sections define a cable channel and in which sand first and second collar portion socket sections define a support socket.

6. A vehicle comprising:
   a container;
   a covering apparatus for said container, said covering apparatus comprising:
     a flexible cover;
     a cable generally supporting said flexible cover, said cable being movable in a cover advancing direction and in a cover retracting direction, a portion of said cover being operably connected to said cable;
     plural supports supporting said cover, at least some of said supports being disposed in a collar, said cable being threaded onto the support for each collar;
     said collars being removably connected to said supports whereby one of said supports may be removed without un-threading said cable from said collar;
     said collar comprising plural separable cable sleeve portions that may be decoupled from one another to permit removal of the collar from said cable and that, when assembled, define a channel for said cable; and
   means for transporting said container.

7. A vehicle according to claim 6, said vehicle comprising an open-top truck.

8. A collar for a container covering system, comprising:
   a first collar portion, said first collar portion including a first collar portion cable sleeve section having a recess of semicircular cross-section and a first collar portion socket section having a socket recess;
   a mating second collar portion, said second collar portion including a second collar portion cable sleeve section having a recess of semicircular cross-section and a second collar portion socket section having a socket recess;
   said first and second collar portions mating to form an assembly in which said first and second collar portion cable sleeve sections define a cable channel and in which sand first and second collar portion socket sections define a support socket.

9. A kit comprising at least two collars, each collar comprising a collar of claim 8.

* * * * *